May 17, 1960  C. O. GLASGOW  2,936,622
LIQUID AND GAS METERING SEPARATORS
Filed Sept. 12, 1955  7 Sheets-Sheet 5

Fig. 9

INVENTOR
Clarence O. Glasgow
BY
ATTORNEYS

Fig.10

INVENTOR
Clarence O. Glasgow

May 17, 1960　　　C. O. GLASGOW　　　2,936,622
LIQUID AND GAS METERING SEPARATORS
Filed Sept. 12, 1955　　　　　　　　　　　　7 Sheets-Sheet 7

INVENTOR
Clarence O. Glasgow

BY

ATTORNEYS

United States Patent Office 2,936,622
Patented May 17, 1960

2,936,622

LIQUID AND GAS METERING SEPARATORS

Clarence O. Glasgow, Tulsa, Okla., assignor to National Tank Company, Tulsa, Okla., a corporation of Nevada Application September 12, 1955, Serial No. 533,873

7 Claims. (Cl. 73—224)

This invention relates to new and useful improvements in liquid and gas metering separators.

One object of the invention is to provide an improved liquid and gas separator metering structure wherein provision is made for delivering uniform quantities of oil to the stock tank whereby such quantities may be measured prior to such delivery, and the number of such quantities so delivered may be calculated in barrels or gallons, thereby permitting direct discharge of oil from the stock tanks to a pipe line without further measurement.

Another object of the invention is to provide an improved metering mechanism for a liquid and gas separator including upper and lower floats, or their equivalents, and controlled valve means whereby a definite quantity of oil is accumulated at each operation, enabling this quantity to be measured so that the input to the stock tank may be ascertained in definite quantities, such as barrels or gallons, without further measurement.

Still another object of the invention is to provide an improved liquid and gas separator metering structure wherein the quantity of oil is definitely controlled to cause the delivery of a measured quantity of oil upon each delivery operation, which operation involves actuation by floats in relatively small chambers so as to minimize the percentage of error in making the measurement.

A further object of the invention is to provide an improved liquid and gas separator metering structure wherein means is provided in the gas vent line whereby practically all of the gas is removed from the oil delivered to the stock tanks so that the measured quantity of oil contains substantially no gas, which makes for measuring accuracy as well as providing a fluid booster to boost the oil to the stock tanks.

A particular object of the invention is to provide an improved liquid and gas metering separator particularly adapted to the utilization of electrical or electronic liquid level detecting means for controlling the filling and emptying of the measuring chamber of the separator.

A construction designed to carry out the invention will be hereinafter described, together with other features of the invention.

The invention will be more readily understood from a reading of the following specification and by reference to the accompanying drawings, wherein examples of the invention are shown, and wherein.

This application is a continuation-in-part of my copending application, Serial No. 284,272, filed April 25, 1952, now abandoned.

Figures 1, 2, 3:
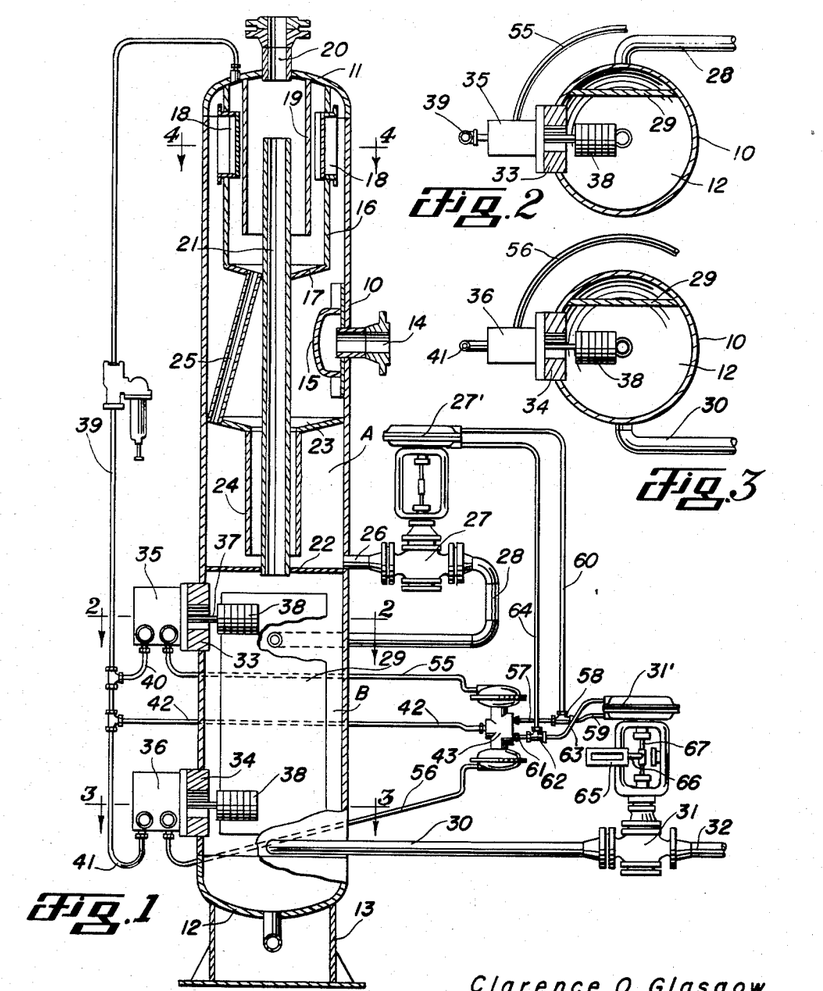
Fig. 1 is a transverse, vertical, sectional view of a separator metering structure constructed in accordance with the invention.
Fig. 2 is a horizontal, cross-sectional view, taken on the line 2—2 of Fig. 1.
Fig. 3 is a horizontal, cross-sectional view, taken on the line 3—3 of Fig. 1.

In the drawings, the numeral 10 designates an upright, cylindrical tank having a dished top or head 11 and a dished bottom 12 supported on a pedestal type base 13. An influent inlet connection 14 is provided at the upper medial portion of the side wall of the tank 10 and discharges into a diverter 15 of any approved structure to cause the influent stream to take a circumferential path and spread vertically on the inner surface of said wall. Thus, the lighter ends and gas ascend and the liquids and heavy components descend. Disposed concentrically within the upper portion of the tank and depending from its head 11 is a cylindrical scrubber 16 having a dished bottom 17 and lateral inlet louvers 18 adjacent its upper end for admitting the rising gas and causing whirling thereof. A concentric vapor sleeve 19, of considerably less diameter than the scrubber 16, depends from the head and terminates short of the dished bottom 17 of said scrubber below the louvers. The lower end of the sleeve 19 is open so that the gas, after having liquids scrubbed therefrom, enters said sleeve lower end and escapes through a reduced outlet connection 20 in the tank head. Of course, additional scrubbing occurs on the inner wall of the sleeve.

An axial, equalizing pipe 21, having its open upper end disposed in the sleeve, extends through the bottom 17 and a cross plate or partition 22, which divides the tank into an upper or separating chamber A and a lower or metering chamber B, and the lower end of the pipe communicates with the latter chamber. Immediately below the diverter 15, an annular, conical plate or partition 23 is secured to the inner surface of the tank side wall and has a down tube 24 depending concentrically of the tank from its inner periphery and terminating just above the partition 22. The equalizing pipe 21, which is of less diameter than the tube 24, extends through said tube. A liquid drain pipe 25 extends from the bottom 17 through the plate 23 for directing liquids scrubbed from the gas in the scrubber 16 to the upper chamber A.

A liquid discharge pipe 26 leads from the chamber A through the tank side wall above the partition 22 to a diaphragm valve 27 of conventional construction and common in this art. The valve 27 has a discharge pipe 28 leading therefrom into the chamber B through the tank side wall and discharges against an upright baffle plate 29 which is secured across one side of the tank (Figs. 1, 2 and 3) and terminates below the partition 22 and above the tank bottom 12. An outlet pipe 30 leads from the opposite side of the tank below the baffle 29 to a diaphragm-controlled outlet valve 31, similar to the valve 27, and a discharge pipe 32 leads from the valve. All of the foregoing elements are more or less standard and incidental to the invention.

Mounted in the side wall of the chamber B are upper and lower collars 33 and 34 and secured on these collars are upper and lower pilot valves 35 and 36, each of substantially identical construction and being of the type well known in this art in which a control fluid outlet is alternately vented when the pilot valve is closed, or supplied with controlled fluid under pressure when the pilot valve is opened. A float arm 37 extends from each valve through the enlarged opening of its collar 33 or 34 and carries a float 38 on its inner end. Gas from the top of the tank is conveyed by external pipe 39 which has a branch 40 leading to the valve 35 and a branch 41 leading to the valve 36. Between the branch pipes 40 and 41, a pipe 42 leads from the pipe 39 to a relay or switching valve 43, shown in detail in Fig. 5. The valve 43 includes a body 44 having an upright, cylindrical bore 45 extending therethrough to diaphragm cups 46 on each end. Diaphragms 47 are secured across the cups 46 and are sealed by concavo-convex covers 48. A cylindrical valve core 49 is snugly slidable in the bore 45 and has a transverse flow passage 50 divided by a horizontal cross partition 50'. The diaphragms 47 are connected to the valve core 49 by axial stems 51 extending from the upper and lower ends of said core.

Figures 5, 7:
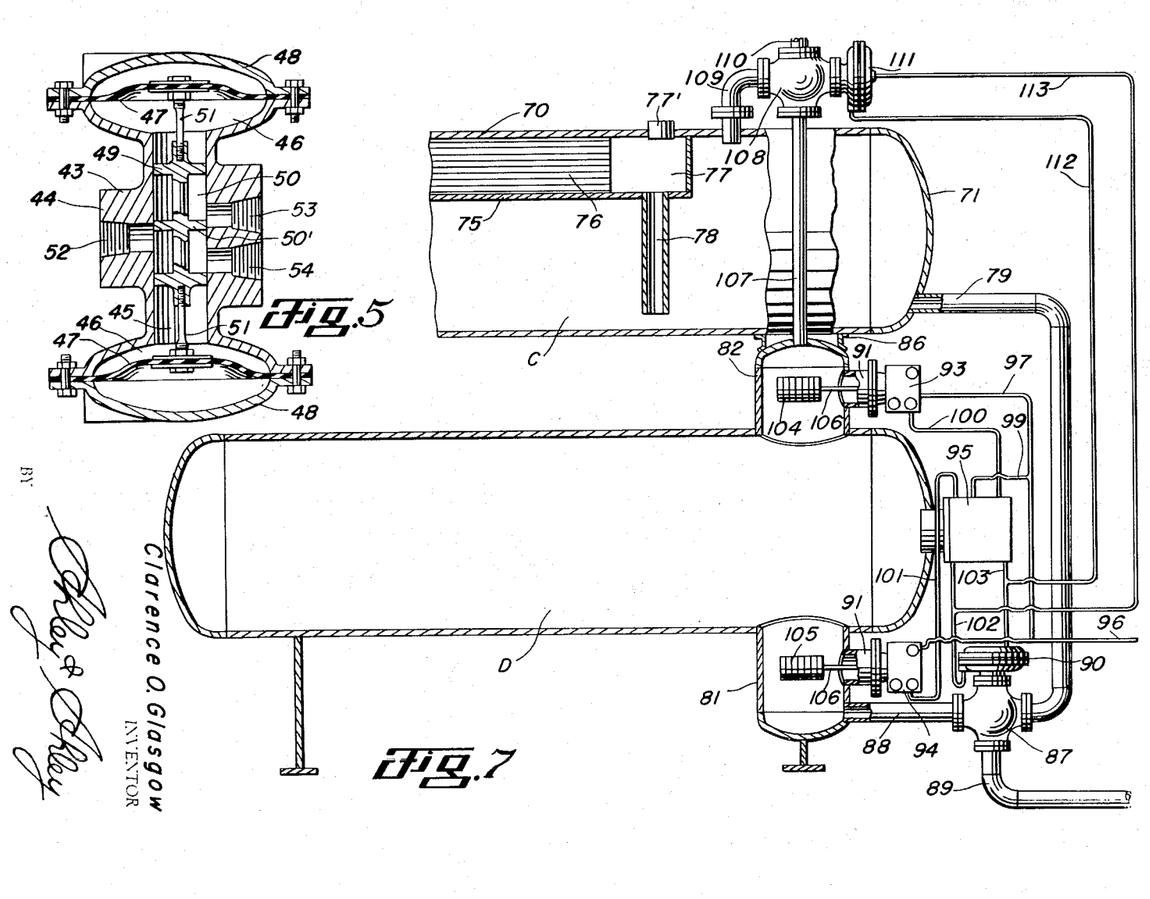
Fig. 5 is an enlarged, transverse, vertical, sectional view of the relay or switching valve.
Fig. 7 is a similar view to Fig. 6 of another modification.

The pipe 42 is attached to an inlet port 52 at the center of the body 44 and its bore 45. An upper outlet port 53 extends from the bore above the inlet port 52, while a lower outlet port 54 extends from the bore below said inlet port. When the diaphragms 47 and valve core 49 are raised, the partition 50' is above the inlet port 52 to shut off flow to the outlet port 53 and said partition is below said inlet port to shut off flow to the inlet port 54 upon downward movement of said diaphragms and valve core. For actuating the diaphragms, control fluid pipes 55 and 56 lead from the control fluid outlets of the pilot valves 35 and 36 to the diaphragm covers 48. From the upper outlet port 53 of the valve 43, a pipe 57 leads to a T 58 and a pipe 59 extends therefrom to the underside of the diaphragm 31' of the valve 31; while a second pipe 60 leads from said T to the top side of the diaphragm 27' of the valve 27. The outlet port 54 is connected by a pipe 61 to a T 62 and a pipe 63 extends from this T to the top of the diaphragm 31', while a second pipe 64 leads from said T to the underside of the diaphragm 27'.

From the foregoing, it is obvious that the pilot valves 35 and 36, being alternately operated by their floats by upper and lower levels of liquid in the chamber B of the tank, the valve 43 is switched accordingly so as to close the valve 27 and open the valve 31 when the pilot valve 35 is actuated to drain the chamber B. The valve 31 is closed and the valve 27 opened when the valve 36 is actuated by a low liquid level in said chamber. It is pointed out that the diaphragm valves 27 and 31, as well as the switching valve 43, have no springs and when shifted into one position will remain in that position until shifted into the other position. Exhaust ports or vents 131 are formed in the body 44 of the switching valve adjacent the ends of its bore 45 for exhausting gas to the atmosphere from one of the conductors 57 and 61 when the other conductor is in communication with the pipe 42. These vents facilitate the flexing of the diaphragms 47 and provide vent means for the diaphragms of the valves 27 and 31.

When the valve 31 is closed and the valve 27 is open, liquid accumulates in the chamber B to the upper level until the upper float 38 is raised sufficiently to open its pilot valve 35 and thereby admit gas by way of pipe 55 to the upper diaphragm cover 48 of the valve 43. The gas depresses the upper diaphragm 47 and moves the core 49 downwardly to direct the gas from the inlet port 52 to the outlet port 53 and the gas in the pipe 42 is supplied to the underside of the diaphragm 31' through the pipes 57 and 59 to open the valve 31, whereby the accumulated liquid in the chamber B is discharged. Even though the receding liquid level in the chamber B is lowered and the float of the upper valve 35 is dropped, there is no change in the switching valve.

When the liquid in the chamber B falls enough to lower the float of the lower pilot valve 36 sufficiently to open said valve, gas is supplied through the pipe 56 to the lower diaphragm of the valve 43 and the core 49 is moved upwardly to the position shown in Fig. 5. The gas in pipe 42 is supplied by pipes 61 and 63 to the top side of the diaphragm 31' to close the valve 31 and shut off the discharge of the liquid from the chamber B. A counter 65 is attached to the frame of the valve 31 and has an actuating lever 66 pivoted to the stem 67 of the valve, whereby each dumping cycle is counted. It is noted that the valve 27 is closed upon opening of the valve 31 to shut off the flow of liquid from the chamber A to the chamber B, whereby a predetermined quantity of liquid is discharge from said chamber B upon each opening of said valve 31. Communication between the chambers is reestablished by opening of the valve 27 upon closing of the valve 31.

Figures 4, 6:
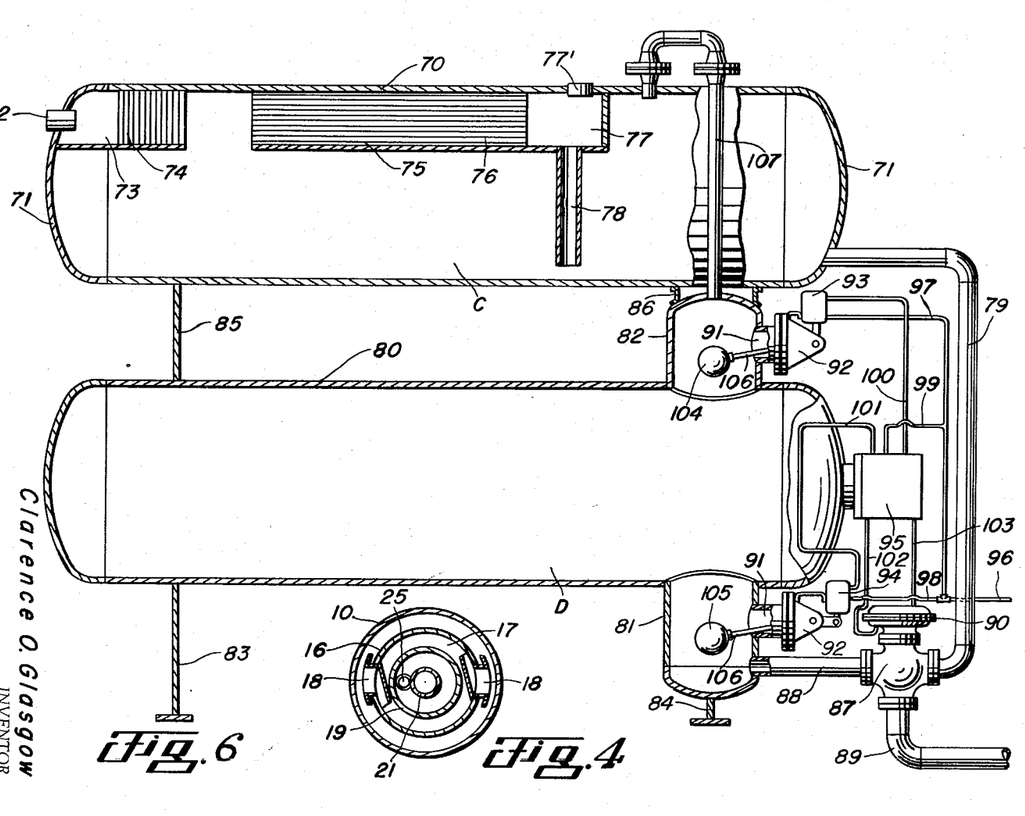
Fig. 4 is a horizontal, cross-sectional view taken on the line 4—4 of Fig. 1.
Fig. 6 is a longitudinal, vertical, sectional view of a modified form of separator metering structure.

The invention is capable of being applied to horizontal as well as to vertical tanks. In Fig. 6, a pair of elongate, horizontal tanks 70 and 80 are shown in spaced relation. The upper tank 70 may be referred to as a separating and volume chamber C and corresponds to the chamber A of the tank 10, while the lower tank 80 may be called a metering chamber D and corresponds to the chamber B of said tank 10. The tank 80 has a depending sump 81 near its discharge end and an upstanding dome 82 extending from its upper side above the sump. A supporting leg 83 is secured to one end of the tank 80 and a supporting foot 84 depends from the sump 81 at its opposite end. The tank 70 is suitably supported above the dome 81, such as by an upright spacer or leg 85 welded to the tanks and brackets 86 welded to said dome and said tank 70.

The tank 70 has concavo-convex ends or heads 71. An inlet collar 72 is secured in one of the heads 71 near its top for directing influents into a horizontal separator 73 extending across the tank and having upright baffles 74 (of the type shown in the patent to Dixon No. 2,349,944) whereby said liquid separated from the gas flows into the lower portion of the tank and the gas flows in a substantially horizontal path to the end of an elongate, horizontal scrubber 75 spaced from the separator. The scrubber 75 has horizontal baffles 76 (of the type shown in the patent to Dixon No. 2,349,944) providing elongate channels, whereby the liquid components are scrubbed out of the stream and flow into a box 77 at the outlet end of said scrubber. An outlet connection 77' extends through the wall of the tank in communication with the box 77 to permit the escape of the gas. For discharging the liquids from the box into the tank, a drain pipe 78 depends from said box. A liquid outlet pipe 79 leads from the head 71 opposite the inlet end of the tank near its bottom and has a three-way valve 87 connected to its lower end. The valve 87 has connection through a short pipe 88 with the side of the sump 81 near the bottom thereof and is of the usual construction common in this art. An outlet or discharge pipe 89 leads from the bottom of the valve which is operated by a diaphragm 90.

As in the first form of the invention, the novelty resides in the valve arrangement or metering mechanism. The sump 81 and dome 82, each have a flanged collar 91 in its side wall to which a head 92 is secured. Pilot valves 93 and 94, similar to the valves 35 and 36, are mounted on the heads 92 of the sump 81 and dome 82. One end of the tank 80 has a relay or switching valve 95 supported thereon and this valve is similar to the valve 43. A gas supply line 96 has a branch 97 leading to the valve 93 and a branch 98 leading to the valve 94 and a branch 99 leads from the branch 97 to the switching valve 95. The valve 93 is connected to the valve 95 by a gas pipe 100, and a gas pipe 101 leads from the valve 94 to said valve 95. A gas line 102 extends from the valve 95 to the bottom of the diaphragm 90, while the top of said diaphragm is connected to said valve 95 by a pipe 103. The sump 81 and dome 82 have floats 104 and 105, similar to the floats 38, mounted therein on arms 106 extending from the heads 92 for actuating the valves 93 and 94. It is believed unnecessary to illustrate or describe the valves and their connection to the floats in detail, since the same are conventional and purchasable on the open market. A gas equalizing pipe 107 extends from the top of the dome 82 above and into the top of the tank 70. A counter, similar to the counter 65 but not illustrated, is adapted to be connected to the valve 87 or to the internal moving parts of the pilot valves 93 or 94 or the switching valve 95. Obviously, a pressure-actuated counter may be connected at any suitable point in the apparatus, or any other suitable means may be employed for recording the number of filling and discharge cycles of the separator structure.

The operation is similar to the first form of the invention in that liquid is accumulated in the volume tank 70 as it is in the chamber A of Fig. 1 and flows out through pipe 79. With the float 105 lowered, the three-way valve 87 is closed to its discharge pipe 89 and the liquid flows through the pipe 88 into the sump 81, raising the float 105 therein, fills the tank 80 and rises in the dome 82 until the float 104 is elevated. During this time, the gas supply from the pipe 96 and its branch 97 through the pilot valve 93, the pipe 100, the relay 95 and the pipe 103 to the underside of the diaphragm 90 is shut off. Gas is supplied from the pipe 96 and its branch 98 through the pilot valve 94, the relay valve 95 and the pipe 101 to the top of the diaphragm 90 to hold the valve 87 in its position establishing communication between the liquid pipes 79 and 88. When the liquid rises in the dome 82 sufficiently to elevate the float 104, the gas flow is reversed whereby the liquid flow from the pipe 79 is shut off by the valve 87 and the liquid drains from the tank 80 and its sump 81 through the pipe 88 to the discharge pipe 89. Upon lowering of the float 105, the pilot valve 93 is actuated so as to actuate the relay valve and direct gas to the underside of the diaphragm whereby the valve 87 is closed to the discharge pipe and communication between the pipes 79 and 88 is reestablished.

Another form of the invention is shown in Fig. 7 and, since the structure is substantially the same as shown in Fig. 6, like numerals designate similar elements. The upper end of the pipe 107 has a three-way valve 108, similar to the valve 87, connected therein above the tank 70. A pipe 109 extends from the valve 108 into communication with the top of the tank and said valve has its other port connected to a source of gas under pressure by a pipe 110. The valve 108 includes a diaphragm 111 having its bottom or inner side connected by a gas pipe 112 with the pipe 103 which extends between the top of the diaphragm 90 of the valve 87 and the relay valve 95. A second gas pipe 113 leads from the top or outer side of the diaphragm 111 to the pipe 102 which extends between the bottom of the diaphragm 90 and the relay valve. Due to this arrangement, the valve 108 is actuated simultaneously with the valve 87 by the relay valve and the pilot valves 93 and 94. When the liquid pipes 88 and 89 are in communication to discharge the liquid from the tank 80, due to lifting of the float 104, gas is supplied through the gas pipe 113 to the outer side of the diaphragm 111 for actuating the valve 108 whereby the gas pipe 109 is closed off and the gas pipes 107 and 110 communicate to direct gas under pressure from the pipe 110 to the tank 80 to drive the accumulated liquid from said tank through said liquid pipes. Upon lowering of the float 105, which actuates the pilot valve 94, gas is supplied to the inner side of the diaphragm 111 through the gas pipe 112 and the valve 108 is actuated to close off the gas pipe 110 and establish communication between the gas pipes 107 and 109 whereby the gas in the tank 80 may escape into the tank 70.

Due to the valve 108, a combination separator and metering fluid booster is provided and the separator may be operated either under atmospheric pressure or under a slight vacuum. Thus, practically all gas would be removed from the oil and the oil discharged through the pipe 89 should contain very little gas because said oil reaches a state of equilibrium at atmospheric pressure in the separator. This arrangement makes for greater accuracy of measurement than when a pressure is carried on the separator, since there is no measuring of the gas in solution in the oil as there is in a separator operating under a pressure. This structure not only provides a more accurate metering arrangement but brings about a fluid booster in conjunction with the metering to boost the oil to the stock tanks.

While the floats 104 and 105 are mounted in the sump 81 and the dome 82, said dome and sump are open to and form parts of the tank 80. Due to the small areas of the sump and dome, the percentage of error is materially reduced because an over-travel or under-travel of the floats represents a very small volume of fluid. Therefore, a more accurate measurement is obtainable. The valves 27, 31 and 87 may be referred to as control valves.

Figures 12, 14:
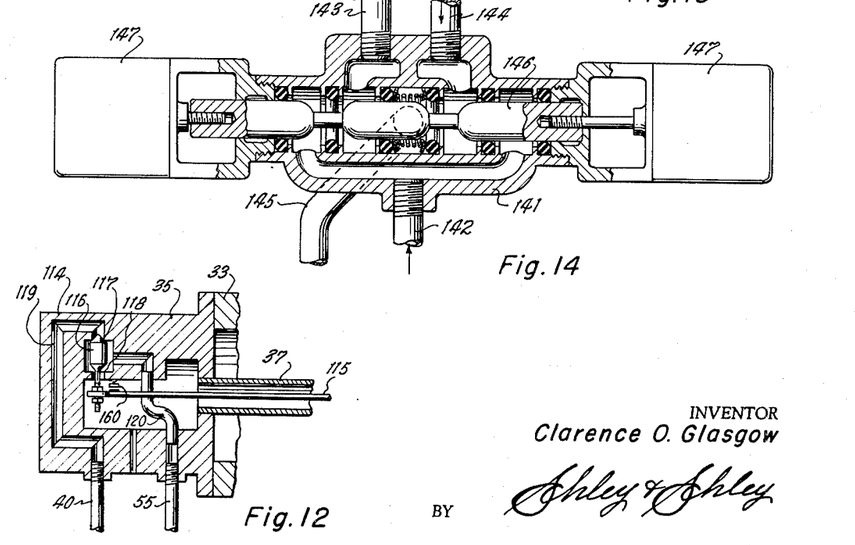
Figs. 12 and 13 are vertical, sectional views of the upper and lower pilot valves, respectively.
Fig. 14 is a longitudinal, sectional view of a further modification of the switching or relay valve.
Figure 13:
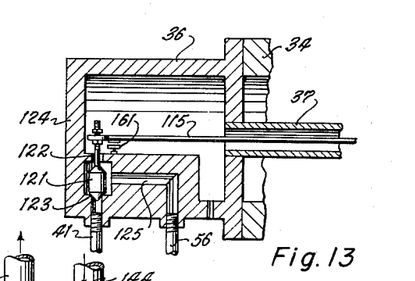

While the pilot valves 35 and 36 of Fig. 1, and the pilot valves 93 and 94 of Figs. 6 and 7 may be of any suitable or desirable structure, typical structures therefor have been illustrated in Figs. 12 and 13. A typical structure for the pilot valve 35 is shown in Fig. 12 and includes the vented housing 114 into which the pressure gas supply pipe 40 and the pressure gas outlet pipe 55 are connected. A valve actuating rod 115 extends through the tubular float arm 37 of the float 38 to the interior of the housing 114 and carries upon its extremity a loosely-mounted double-ended valve core 116 adapted to engage an upper valve seat 117 or an alined lower valve seat 118. A passage 119 leads from the pipe 40 to the upper valve seat 117, and the lower valve seat 118 is vented to the interior of the housing 114. Conducting means 120 is provided for placing the pipe 55 in communication with the annulus surrounding the valve core 116.

A typical structure for the lower pilot valve 36 is also shown in Fig. 13 and constitutes a substantial inversion of the structure of Fig. 12. The rod 115 carries a similar loosely-mounted, double-ended valve core 121 adapted to engage an upper seat 122 or an alined lower seat 123. The pressure gas inlet conductor 41 is in communication with the lower seat 123, and the upper seat 122 opens into the vented interior of the vented housing 124. The pressure gas outlet conductor 56 communicates through a passage 125 with the annulus around the valve core 121.

Assuming that the lower chamber B of the metering separator of Fig. 1 is draining, the upper float 38 will be in its downward position whereby the valve core 116 is engaging the seat 117 and the flow of pressure gas from the pipe 40 is cut off. Accordingly, the lower diaphragm of the switching valve 43 will be vented to the atmosphere through the valve seat 118.

The lower float 38 will be in its elevated position whereby the valve core 121 will be in engagement with the seat 123, thus shutting off the admission of pressure gas from the conductor 41 and venting the conductor 56 to atmosphere through the interior of the housing 124. Thus, the upper diaphragm of the switching valve 43 will also be vented, but the valve will previously have been placed in a position wherein pressure gas is being supplied through the outlet 53 to the conductor 57, and being springless, the switching valve will remain in this position. Thus, the valve 31 will be open and the valve 27 will be closed.

When the liquid level reaches the lower float 38 to lower the same, the valve core 121 will be lifted from the seat 123 into engaging with the seat 122, thus shutting off the venting of the conductor 56 and admitting pressure gas thereto from the pipe 44. When this occurs, gas under pressure is admitted to the lower diaphragm of the switching valve 43, thus shifting the valve into the position shown in Fig. 5 to switch the flow of pressure gas from the outlet 53 to the outlet 54, and admitting the pressure gas to the conductor 61 for closing the valve 31 and opening the valve 27. The upper diaphragm of the switching valve 43 remains vented to the atmosphere, thus permitting this shifting of the switching valve.

As the chamber B begins to fill, the lower float 38 will move into its upper position, shutting off the flow of pressure gas to the pipe 56, but again, the valve 43 being springless, this venting of the lower diaphragm of valve 43 to atmosphere will not cause the valve to shift position. The filling of the chamber B continues until the liquid level reaches the upper float 38 to raise the same, at which time the valve core 116 will be shifted downwardly to admit pressure gas to the conductor 55, pressurizing the upper diaphragm of the switching valve 43 and again shifting the switching valve to cause the switching of pressure gas flow from the conductor 61 to the conductor 57. Here again, the valve 31 is opened, and the valve 27 is closed to repeat the cyclic operation.

The same structure and operation applies to the relay valves 93 and 94 of the modifications of the invention illustrated in Figs. 6 and 7. As shown by the numerals 160 and 161, the housings 114 and 124 are provided with magnets for attracting the rods 115 to move the valve cores 116 and 121 into engagement with the valve seats 117 and 123 with a snap action for quick control of the pilot valves and rapid opening of the main control valves.

Figure 11:
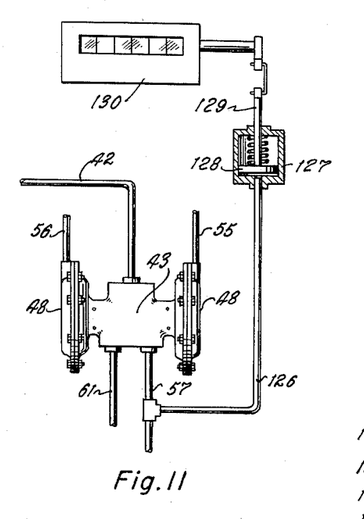
Fig. 11 is an elevational view, partly broken away to illustrate the structure for counting measuring cycles of the separator.

In the event totally enclosed valves are employed for the valves 27 and 31, and in the case of the three-way valves 87 and 108 which, as illustrated, are totally enclosed, the admission of actuating gas to either of the outlets 53 and 54 of the switching valve 43 may be employed for actuating a counting mechanism as illustrated in Fig. 11. As shown therein, a branch conductor 126 may lead from the conductor 57 to a cylinder 127 having therein a pressure-responsive piston 128. The rod 129 of the piston is suitably linked to a counting mechanism 130 which thus records each instance of application of pressure through the conductor 57. Such application of pressure takes place only once during each filling and unloading cycle of the measuring chamber B and hence, an accurate and proper count of the filling cycles of the metering separator will be maintained. Obviously, the conductor 126 could be connected to the pipe 61 rather than the pipe 57, and the piston and cylinder structure 127 could be replaced by a diaphragm structure or any other suitable pressure-responsive means.

In place of the float mechanisms utilized in the previously described embodiments of the invention, electrical or electronic liquid level responsive means or probes may be employed for detecting the filling and emptying of the measuring chamber of the various modifications of the separator. Such liquid level probes are in general of a capacitive type and respond electrically or electronically to the presence or adjacency of a liquid gas interface for instituting or terminating an electrical signal to a suitable amplification and detecting means which, in turn, electrically or by control of the flow of gas under pressure actuates a switching valve for opening and closing the filling and draining valves of the metering or measuring chamber. Liquid level probes of this type are commercially available under the trademarks Electr-O-Level and Electr-O-Probe, from Instruments Incorporated of Tulsa, Oklahoma.

Figure 9:
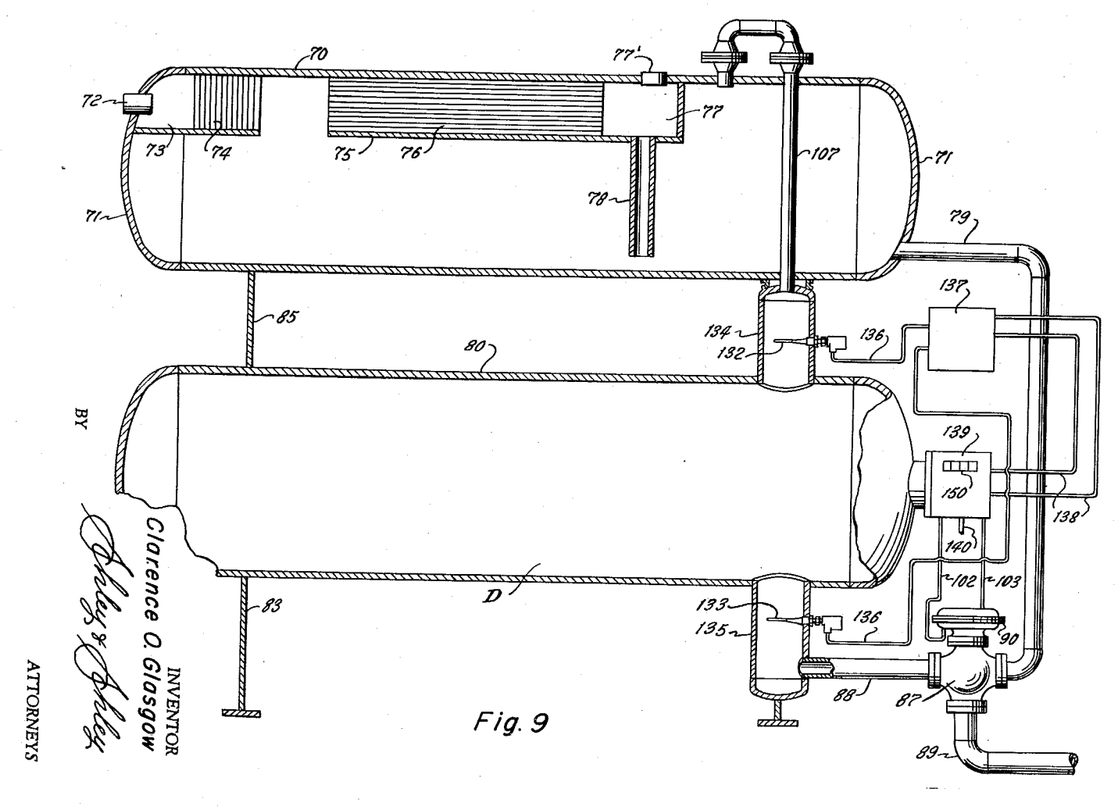
Fig. 9 is a longitudinal, vertical, sectional view of an additional modification of the invention.

In Fig. 9 of the drawings is shown a modification of the invention utilizing electronic liquid level probes, the structure of the metering separator being substantially identical to that shown in Fig. 6 and the elements thereof being identified by the same numerals. In place of the floats 104 and 105, however, electronic liquid level probes 132 and 133, respectively, are employed, the probes being mounted respectively in an upper dome 134 and a lower sump 135. It will be noted that the dome 134 and sump 135 are of somewhat smaller diameter than the dome 82 and sump 81 of the form of the invention shown in Fig. 6, this utilization of smaller diameter enclosures being made possible because no appreciable internal space is required for physical movement of the liquid level probes, and because the probes are not affected by the velocity of liquid flow thereover. Accordingly, even greater accuracy in volume measurement is made possible by reason of the very rapid change in liquid level within the dome 134 and sump 135 in proportion to the rate of liquid inflow or outflow from the metering chamber D of the modification of Fig. 9.

The probes 132 and 133 are connected by electrical conductors 136 to a suitable amplifying and control mechanism 137 which, in turn, is connected by a pair of electrical conductors 138 to a relay valve 139. Pressure gas is supplied to the relay valve 139 through an inlet pipe 140, and the pressure gas outlet conductors 102 and 103 lead from the relay valve 139 to the valve 87.

A suitable structure for the relay valve 139 is illustrated in Fig. 14 and includes a four-way valve 141 having a pressure gas inlet conductor 142 and pressure gas outlet conductors 143 and 144 connected, respectively, to the conductors 102 and 103. A vent conductor 145 is provided for exhausting to atmosphere that one of the conductors 143 and 144 which is not receiving pressure gas from the inlet 142. The four-way valve core 146 is provided with an electrical solenoid 147 at each end, the solenoids being alternately energized through the electrical conductors 138. The electrical or electronic probes 132 and 133 being responsive to the presence or adjacency of a liquid gas interface, it is apparent that the amplifier structure 137 energizes only one of the solenoids 147 at any one moment, and the valve core 146, being springless, remains in the position to which it is shifted by the energized solenoid. This is in accordance with presently known and well established control procedure. Obviously, the operation of this modification is the same as that of the previously described forms of the invention, the primary differences being the shifting of the switching valve by electrical means rather than gas pressure means, and the utilization of the small diameter dome 134 and sump 135.

Figure 10:
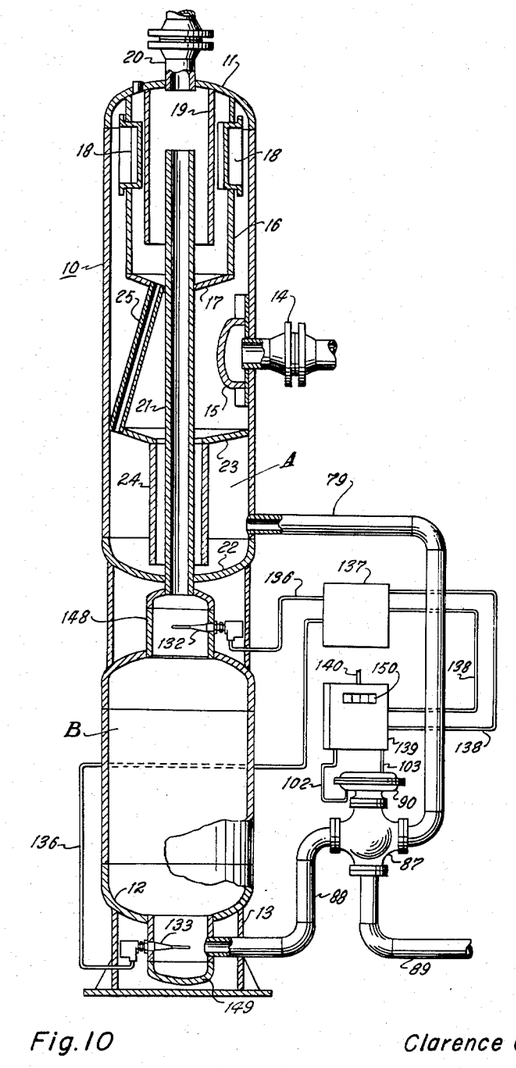
Fig. 10 is a vertical, sectional view of an additional vertical modification of the invention.

The liquid level probes may also be utilized in a vertical modification of the metering separator, as shown in Fig. 10, and this modification will facilitate the employment of an upper dome 148 and a lower sump 149, thus making available in the vertical form of the invention the advantages of the small diameter zones for detection of the liquid level. In essence, the structure of the separator of Fig. 10 is the same as that shown in Fig. 1, the liquid flow conductors, three-way valve and valve operating mechanism being the same as shown in Fig. 9. In both instances, the counting mechanism may be as illustrated in Fig. 11, the face of the counter being exposed through the window 150 of the housing for the switching valve 139.

Figure 8:
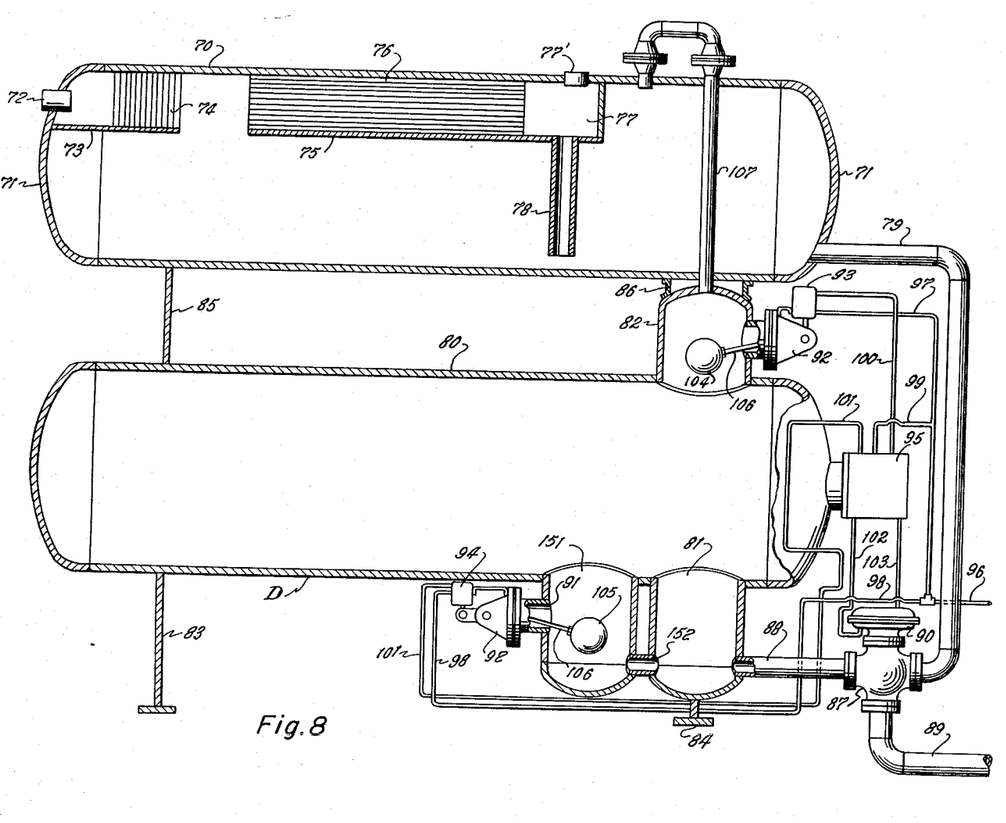
Fig. 8 is a longitudinal, vertical, sectional view of a further modification of the invention.

A still further modification of the form of the metering separator shown in Fig. 6 is illustrated in Fig. 8, this structure again being substantially identical to that of Fig. 6 but including in addition to the sump 81, an additional sump 151 within which the float 105 is positioned. The lower portions of the sumps 151 and 81 are connected by a liquid level equalizing pipe 152, and the outlet pipe 88 leads from the sump 81. The advantage of this modification over that shown in Fig. 6 is to be found in a tendency of floats to respond to liquid flow thereover, the liquid flow downwardly through the sump 81 of Fig. 6 to depress the float 105 and impairing to some extent the accuracy of measurement achieved. In the modification of Fig. 8, there is no liquid flow downwardly through the sump 151 until the liquid level enters the upper ends of the sumps 151 and 81, the predominant if not exclusive flow of outgoing liquid being through the sump 81. Hence, the float 105 is not affected by downwardly flowing liquid, and a more accurate measuring of the volume of liquid, along with a more consistent and uniform point of operation of the float 105 is obtained. In other respects, the modification of Fig. 8 is substantially identical in structure to that of Fig. 6 and the same numerals have been applied thereto.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A metering structure including, means forming a metering chamber, valve means controlling the admission of liquid to the metering chamber and the discharge of liquid from said metering chamber, relay means for controlling the valve means so as to control the actuation of said valve means, the relay means being movable between actuating positions for selectively controlling said valve means and admitting liquid to and discharging liquid from said metering chamber, upper and lower enclosures in open communication with and forming a part of said metering chamber and of less horizontal cross-sectional area than said metering chamber, upper and lower liquid level responsive means within the upper and lower enclosures respectively, said liquid level responsive means being responsive to high and low liquid levels in said metering chamber, said upper and lower enclosures being constructed and arranged with respect to the metering chamber so that at high liquid level the entire flow of liquid into the metering chamber is directed into the upper enclosure and at low liquid level the entire discharge of liquid from the metering chamber is from the lower enclosure, and actuating means connected with and operated by each liquid level responsive means, each actuating means having separate connection with said relay means for moving said relay means between its actuating positions, whereby said liquid admission and discharge valve means is actuated in response to the liquid level in said metering chamber to admit liquid thereto and to discharge fixed quantities of liquid therefrom.

2. A metering structure as set forth in claim 1, wherein the valve means and the relay valve are gas-actuated, the relay valve controlling the supply of actuating gas to the valve means, and each actuating means including a pilot valve controlling the supply of actuating gas to said relay valve.

3. A metering structure as set forth in claim 1, wherein the liquid level responsive means are elements electrically responsive to the adjacency of a gas liquid interface for energizing the actuating means.

4. A metering structure as set forth in claim 1, wherein the metering chamber comprises a horizontal vessel, and the lower enclosure includes a pair of sumps connected for liquid flow therebetween, one sump having a liquid discharge outlet, and the lower liquid level responsive means being disposed in the other of said sumps.

5. A metering structure as set forth in claim 1, wherein the metering chamber is within a vessel, and the lower enclosure includes a pair of sumps connected for liquid flow therebetween, one sump having a liquid discharge outlet, and the lower liquid level responsive means being disposed in the other of said sumps.

6. A metering structure including, means forming a metering chamber, valve means controlling the admission of liquid to the metering chamber and the discharge of liquid from said metering chamber, relay means for controlling the valve means so as to control the actuation of said valve means, the relay means being movable between actuating positions for selectively controlling said valve means and admitting liquid to and discharging liquid from said metering chamber, upper and lower enclosures in open communication with and forming a part of said metering chamber and of less horizontal cross-sectional area than said metering chamber, the upper enclosure being a dome opening upwardly from the upper portion of the metering chamber and the lower enclosure being a sump opening downwardly from the lower portion of the metering chamber, upper and lower liquid level responsive means within the upper and lower enclosures respectively, said liquid level responsive means being responsive to high and low liquid levels in said metering chamber, and actuating means connected with and operated by each liquid level responsive means, each actuating means having separate connection with said relay means for moving said relay means between its actuating positions, whereby said liquid admission and discharge valve means is actuated in response to the liquid level in said metering chamber to admit liquid thereto and to discharge fixed quantities of liquid therefrom.

7. A metering structure including, an oil and gas separator, a gas outlet from the separator, a liquid outlet from the separator, means forming a metering chamber, the liquid outlet being connected to the metering chamber, valve means controlling the admission of liquid to the metering chamber from the separator and the discharge of liquid from said metering chamber, relay means for controlling the valve means so as to control the actuation of said valve means, the relay means being movable between actuating positions for selectively controlling said valve means and admitting liquid to and discharging liquid from said metering chamber, upper and lower enclosures in open communication with and forming a part of said metering chamber and of less horizontal cross-sectional area than said metering chamber, upper and lower liquid level responsive means within the upper and lower enclosures respectively, said liquid level responsive means being responsive to high and low liquid levels in said metering chamber, said upper and lower enclosures being constructed and arranged with respect to the metering chamber so that at high liquid level the entire flow of liquid into the metering chamber is directed into the upper enclosure and at low liquid level the entire discharge of liquid from the metering chamber is from the lower enclosure, and actuating means connected with and operated by each liquid level responsive means, each actuating means having separate connection with said relay means for moving said relay means between its actuating positions, whereby said liquid admission and discharge valve means is actuated in response to the liquid level in said metering chamber to admit liquid thereto and to discharge fixed quantities of liquid therefrom, the valve means including a valve actuated by the relay means and connected with the metering chamber for supplying gas thereto from a pressure source upon the discharge of liquid from the metering chamber to boost the pressure of said liquid discharge.

References Cited in the file of this patent

UNITED STATES PATENTS

| | | |
|---|---|---|
| 936,358 | Rak | Oct. 12, 1909 |
| 1,788,186 | Boutillon | Jan. 6, 1931 |
| 1,907,001 | Peter | May 2, 1933 |
| 2,158,381 | Raymond | May 16, 1939 |
| 2,211,282 | McKeever | Aug. 13, 1940 |
| 2,817,967 | Meyers | Dec. 31, 1957 |